United States Patent [19]

Yoshizawa et al.

[11] Patent Number: 5,670,226

[45] Date of Patent: Sep. 23, 1997

[54] REMOVABLE ADHESIVE SHEET

[75] Inventors: Katsuaki Yoshizawa; Akira Kunihiro, both of Amagasaki, Japan

[73] Assignee: New Oji Paper Co., Ltd., Tokyo, Japan

[21] Appl. No.: 572,781

[22] Filed: Dec. 15, 1995

[30] Foreign Application Priority Data

Dec. 15, 1994 [JP] Japan ................. 6-311927

[51] Int. Cl.$^6$ ................. B32B 7/06; B32B 7/12
[52] U.S. Cl. ................. 428/40.1; 283/81
[58] Field of Search ................. 428/41.5, 41.8, 428/40.1; 283/81

[56] References Cited

FOREIGN PATENT DOCUMENTS 5-59335 A   3/1993   Japan .

*Primary Examiner*—Alexander Thomas
*Attorney, Agent, or Firm*—Kubovcik & Kubovcik

[57] ABSTRACT

Disclosed is a removable adhesive sheet comprising a release liner, an adhesive layer and a surface stock as laminated, wherein the adhesive layer being formed by applying an adhesive to the release liner or to the surface stock, followed by drying, said adhesive comprising (i) an aqueous emulsion of a copolymer obtained by emulsion polymerization and (ii) a polyglycidyl compound having two or more epoxy groups within the molecule thereof, said copolymer comprising (a) 80–99% by weight of a (meth)acrylic acid $C_8$–$C_{12}$ alkyl ester, (b) 0.3–10% by weight of (meth)acrylonitrile, (c) 0.1–5% by weight of an $\alpha,\beta$-unsaturated carboxylic acid and (d) 0–5% by weight of another copolymerizable monomer, said copolymer having a Mn of not less than $0.1 \times 10^4$ but less than $5.0 \times 10^4$, ratio of (Mw/Mn) of 40–800, an average particle size of 100–500 nm and a Tg of not higher than −50° C., and said polyglycidyl compound being used in an amount such that the epoxy groups amount to 0.5 to 2 equivalents relative to the carboxyl groups in said copolymer.

15 Claims, No Drawings

REMOVABLE ADHESIVE SHEET

FIELD OF THE INVENTION

The present invention relates to a removable adhesive sheet to be used, for example, as a label for process control or a price label and, in particular, to a removable adhesive sheet suited for use as an index label for a video or audio cassette, a floppy disk or the like.

BACKGROUND OF THE INVENTION

Adhesive sheets, as processed into labels, seals, stickers and emblems, for instance, are very widely used for commercial, office and household use, among others. The structure of adhesive sheets is generally such that an adhesive (pressure sensitive adhesive) layer is sandwiched between a surface stock and a release liner. As the surface stock, paper, a film, a metal foil or the like is used. As the release liner, high-density base paper such as glassine paper, clay-coated paper, polyethylene-laminated base paper or the like, coated with a release agent such as a silicone compound or a fluorine-containing compound, is used. The adhesive may be any of various rubber-based, acrylic-based, vinyl ether-based or other adhesives of the emulsion, solvent or solventless type.

Such adhesive sheets are classified into two types, namely the permanent adhesion type which, after application to articles such as commodities, are kept adhered thereto for permanent use, and the removable type to be removed and discarded after attainment of the purpose of display depending on the use or the like of commodities. The so-called removable adhesive sheets are of the latter type.

Removable adhesive sheets are used, for example as price labels for articles the price of which is subject to frequent change or as labels for process control purposes. Such labels are fundamentally required to have good removability such that when they are eventually peeled off, they can easily be removed without leaving any broken portion of the surface stock or the adhesive on the articles such as commodities or, in other words, without causing article soiling which impairs the appearance of the articles. The retention of an adhesive on an article is briefly termed "adhesive transfer".

In an application thereof, removable adhesive sheets are used as index labels for video and audio cassettes, floppy disks and the like. When the information contained in tapes or disks is substituted with other information newly recorded, the old labels are peeled off and discarded and new labels are applied to the housing of the cassette tapes or to the jacket of disks. Therefore, such labels are required to have good removability as mentioned above.

On the other hand, these index labels experience changes in temperature, for instance, in video cassette decks or other apparatus and, as a result, they readily present lifting or edge lifting. Such phenomenon is a serious problem since it is directly associated with mechanical troubles such as failure in cassette ejection.

SUMMARY OF THE INVENTION

It is an object of the present invention to provide a removable adhesive sheet which can solve the problems mentioned above and which shows good removability at the time of peeling off from an article without causing surface stock breakage or adhesive transfer, hence without soiling the article or impairing the appearance thereof but which, once applied to an article, will not allow lifting or edge lifting.

The removable adhesive sheet according to the present invention comprises a release liner, an adhesive layer and a surface stock as laminated, wherein said adhesive layer is formed by applying an adhesive to the release liner or to the surface stock, followed by drying, said adhesive comprising (i) an aqueous emulsion of a copolymer obtained by emulsion polymerization and (ii) a polyglycidyl compound having two or more epoxy groups within the molecule thereof, said copolymer comprising, based on the whole copolymer weight basis, (a) 80 to 99% by weight of a (meth)acrylic acid $C_8$–$C_{12}$ alkyl ester, (b) 0.3 to 10% by weight of (meth)acrylonitrile, (c) 0.1 to 5% by weight of an $\alpha,\beta$-unsaturated carboxylic acid, and (d) 0 to 5% by weight of other monomer copolymerizable with the above-mentioned monomers (a), (b) and (c), said copolymer having a polystyrene-equivalent number average molecular weight of not less than $0.1 \times 10^4$ but less than $5.0 \times 10^4$, a polystyrene-equivalent weight average molecular weight (Mw)/polystyrene-equivalent number average molecular weight (Mn) ratio (namely Mw/Mn) of 40 to 800, an average particle size of 100 to 500 nm and a glass transition temperature of not higher than −50° C., and said polyglycidyl compound being used in an amount such that the epoxy groups amount to 0.5 to 2 equivalents per equivalent of the carboxyl groups in said copolymer.

The terms "polystyrene-equivalent weight average molecular weight" and "polystyrene-equivalent number average molecular weight" as used herein are intended to mean, respectively, the weight average molecular weight and number average molecular weight as determined by gel permeation chromatography (GPC) using a calibration curve obtained with use of a monodisperse polystyrene.

It is preferable that the adhesive further contains a pigment.

DETAILED DESCRIPTION OF THE INVENTION

To solve the problems described hereinabove, the present inventors made investigations and analyses such as mentioned below.

Removable adhesive sheets are generally produced by applying an adhesive to a release paper, drying the same and attaching or superposing a surface stock to the resulting adhesive layer under pressure to thereby cause transfer (onto the surface stock). For use, the surface stock and the adhesive layer constitute a label, and the label is peeled off or released from the release paper and then affixed to an article. In this case, when the label composed of the surface stock and the adhesive layer is to be peeled off from the article, if the adhesive constituting the adhesive layer is poor in the effect of anchoring on the surface stock, the adhesive layer will not be peeled off from the article but the surface stock alone is peeled off, so that adhesive transfer results.

Conversely, if the adhesive layer has an excessive high effect of anchoring on the surface stock, the opacity of the label will decrease and the so-called bleeding will occur, impairing the appearance of the front side of the surface stock. This bleeding is a phenomenon that some components of the adhesive in contact with the rear side of the surface stock permeate through the surface stock and come out from its front side, and may occur any time from the adhesive sheet production by superposing the surface stock on the adhesive layer, irrespective of whether the sheet is in a state attached to an article or not.

On the other hand, when the adhesion of the adhesive to articles is lowered to thereby improve the removability of labels, the adhesion to the surface stock also decreases, causing adhesive transfer and/or lifting or edge lifting of the label due to the influence of temperature changes or the like. Conversely, in cases where the adhesion is increased to an excessive extent and when paper is used as the surface stock, paper break is likely to occur.

Thus, removable adhesive sheets are required to be well balanced among the adhesion of the adhesive to articles, the label removability from articles and the adequate permeation of the adhesive into the surface stock, among others.

Based on the above investigations and analyses, the present inventors made various trials and attempts and found that removable adhesive sheets which, when applied to articles, present no label lifting or edge lifting and, when peeled off, exhibit good removability and which do not lead to surface stock impairment due to bleeding can be produced with ease under the conditions mentioned above. The present invention has been accomplished based on this finding.

The present invention will be described below in detail.

1 ADHESIVE LAYER

The term "(meth)acrylic acid" as used herein means "acrylic acid and/or methacrylic acid". Similarly, the term "(meth)acrylonitrile" means "acrylonitrile and/or methacrylonitrile".

The copolymer to be used in the present invention is prepared by copolymerizing a monomer mixture comprising the following monomers (a)–(d).

(a) Comonomer (a)

As typical examples of the (meth)acrylic acid $C_8$–$C_{12}$ alkyl ester, namely the comonomer (a) for producing the copolymer to be used in accordance with the present invention, there may be mentioned 2-ethylhexyl acrylate, 2-ethylhexyl methacrylate, n-octyl acrylate, n-octyl methacrylate, isononyl acrylate, isononyl methacrylate, lauryl acrylate, lauryl methacrylate and the like. Preferred among these are 2-ethylhexyl acrylate, isononyl acrylate and lauryl methacrylate. Such (meth)acrylic acid esters may be used singly or at least two of them may be used in combination.

The (meth)acrylic acid $C_8$–$C_{12}$ alkyl ester monomer is used in an amount of 80 to 99% by weight, preferably 85 to 99% by weight, more preferably 90 to 98% by weight, based on the whole weight of the monomer mixture. If the amount is less than 80% by weight, the adhesion of the resulting adhesive to articles will be too weak, so that the problem of lifting or edge lifting will arise. If the amount exceeds 99% by weight, the adhesion of the resulting adhesive to articles will be too strong, possibly causing paper break or the like, allowing a part of the paper or the like to remain sticking to the articles, and therefore the problem of article soiling will arise.

If a (meth)acrylic acid alkyl ester monomer other than said (meth)acrylic acid $C_8$–$C_{12}$ alkyl ester monomer is used in a proportion of 80–99% by weight based on the whole monomer mixture weight, for example, if butyl acrylate is used, the adhesive will have excessively high effect of anchoring on the surface stock, impairing the appearance of the surface stock, or the adhesion to articles will become too strong, leading to poor removability.

(b) (Meth)acrylonitrile

The use of (meth)acrylonitrile, namely the comonomer (b) for the copolymer, in a particular proportion in accordance with the present invention makes it possible to obtain an adhesive which will not cause soiling of articles. The amount of (meth)acrylonitrile is 0.3 to 10% by weight, preferably 0.5 to 7% by weight, more preferably 0.7 to 5% by weight, based on the weight of the monomer mixture. Outside of the above range, the above-mentioned effect of preventing article soiling is insufficient and article soiling tends to occur due to paper break or adhesive transfer.

(c) Comonomer (c)

As typical examples of the $\alpha,\beta$-unsaturated carboxylic acid to be used as comonomer (c) in producing the copolymer, there may be mentioned acrylic acid, methacrylic acid, itaconic acid, maleic acid, fumaric acid and the like. Among them, acrylic acid and methacrylic acid are preferred. These $\alpha,\beta$-unsaturated carboxylic acids may be used either singly or at least two of them may be used in combination.

The amount of the $\alpha,\beta$-unsaturated carboxylic acid to be used is especially important, and is in the range of 0.1 to 5% by weight, preferably 0.2 to 4% by weight, more preferably 0.3 to 3% by weight, based on the whole weight of the monomer mixture. If the amount is less than 0.1%, the effect of anchoring of the adhesive on the surface stock will be too high, possibly impairing the surface stock appearance. If the amount is more than 5% by weight, the anchoring effect will be too low, resulting in inferior removability, or the adhesive will be susceptible to deterioration due to humidity.

(d) Comonomer (d)

As particular examples of comonomer (d), namely the monomer copolymerizable with the above-mentioned (a) (meth)acrylic acid $C_8$–$C_{12}$ alkyl ester, (b) (meth) acrylonitrile and (c) $\alpha,\beta$-unsaturated carboxylic acid, there may be mentioned vinyl monomers.

Examples thereof are acrylic acid alkyl esters and methacrylic acid alkyl esters in which the alkyl group contains not more than 7 carbon atoms, such as methyl acrylate, methyl methacrylate, ethyl acrylate, ethyl methacrylate, isopropyl acrylate, isopropyl methacrylate, butyl acrylate and butyl methacrylate, acrylic acid hydroxyalkyl esters (in particular $C_1$–$C_{10}$ hydroxyalkyl esters) and methacrylic acid hydroxyalkyl esters (in particular $C_1$–$C_{10}$ hydroxyalkyl esters), such as hydroxyethyl acrylate and hydroxyethyl methacrylate, acrylic acid alkoxyalkyl esters (in particular $C_1$–$C_{10}$ alkoxyalkyl esters) and methacrylic acid alkoxyalkyl esters (in particular $C_1$–$C_{10}$ alkoxyalkyl esters), such as methoxyethyl acrylate and ethoxymethyl acrylate, acrylic acid glycidyl esters and methacrylic acid glycidyl esters, such as glycidyl acrylate and glycidyl methacrylate, amides such as acrylamide, methacrylamide, N-methylolacrylamide, N-methoxymethylacrylamide and N-methoxybutylacrylamide, unsaturated aromatic hydrocarbons such as styrene and $\alpha$-methylstyrene, and so on. Among them, preferred are methyl methacrylate, butyl acrylate, N-methylolacrylamide, and the like.

These copolymerizable monomers may be used singly or at least two of them may be used conjointly.

Such monomers copolymerizable with the (meth)acrylic acid $C_8$–$C_{12}$ alkyl ester, (meth)acrylonitrile and α,β-unsaturated carboxylic acid are used in a proportion of 0 to 5% by weight based on the whole monomer mixture weight. When they are used in amounts more than 5% by weight, the adhesion of the resulting adhesive to articles will be too weak to prevent the problems of lifting or edge lifting of labels.

In accordance with the present invention, said copolymer emulsion is prepared by subjecting the monomer mixture mentioned above to emulsion polymerization in water. It is especially important that the copolymer in the product emulsion have a number-average molecular weight, as expressed in terms of polystyrene equivalent. (as determined by GPC method using a calibration curve obtained with use of monodisperse polystyrene), of not less than $0.1\times10^4$ but less than $5.0\times10^4$, preferably not less than $0.3\times10^4$ but less than $4.5\times10^4$, more preferably not less than $0.5\times10^4$ but less than $4.0\times10^4$. If it is less than $0.1\times10^4$, the effect of anchoring the adhesive to the surface stock will be excessive, so that the appearance of the surface stock may be impaired, or the adhesion to articles will become too strong, so that the adhesive sheet may have inferior removability due to the increased possibility of paper break. Conversely, if it exceeds $5.0\times10^4$, the anchoring effect will be too low, so that the removability may be unsatisfactory due to the occurrence of adhesive transfer, or the adhesion may become decreased, allowing lifting or edge lifting of labels.

The ratio (Mw/Mn) of polystyrene-equivalent weight average molecular weight (Mw) to polystyrene-equivalent number average molecular weight (Mn) is 40 to 800, preferably 50 to 700, more preferably 60 to 600. Outside of said range, lifting or edge lifting of labels may occur, or the anchoring effect on the surface stock may be excessive, impairing the appearance of the surface stock.

The average particle size of the copolymer particles in the emulsion is also an important factor and should be within the range of 100 to 500 nm, preferably 150 to 450 nm, more preferably 180 to 400 nm. An average particle size smaller than 100 nm may result in an excessive anchoring effect of the adhesive to the surface stock, impairing the appearance of the surface stock. If it is larger than 500 nm, the anchoring effect will be insufficient, rendering the removability inferior owing to adhesive transfer.

In the practice of the present invention, it is important that the polystyrene-equivalent number average molecular weight and average particle size of the copolymer are balanced and, by preparing the copolymer so that both the factors are within the respective ranges mentioned above, a removable adhesive sheet excellent in removability, surface stock appearance and adhesion can be obtained.

The copolymer constituting the adhesive according to the present invention has a glass transition temperature of not higher than −50° C., preferably in the range of −90° C. to −50° C. If the glass transition temperature is higher than −50° C., the adhesion of the adhesive will be insufficient, tending to allow lifting or edge lifting of labels.

In the practice of the present invention, the glass transition temperature Tg is calculated based on the following mathematical expression (1)

$$1/Tg = \sum_{i=1} \frac{Wi}{Tgi} \quad (1)$$

where

Tg: glass transition temperature of the copolymer (in absolute temperature)

Tgi: glass transition temperature of homopolymer of the ith monomer (in absolute temperature)

Wi: weight fraction of the ith monomer

In accordance with the present invention, the monomer mixture mentioned above is copolymerized by emulsion polymerization in water. If other polymerization methods, such as solution polymerization, are used for the polymerization of said monomer mixture, the anchoring effect of the adhesive on the surface stock will be too high and the appearance of the surface stock may be impaired, or the adhesion to articles will be too strong, leading to inferior removability.

So far as the copolymerization is conducted in the manner of emulsion polymerization, the polymerization process factors are not particularly limited, and any conventional processes may be employed. Thus, for example, the monomer mixture mentioned above may be emulsified in an aqueous solution containing an emulsifier such as polyoxyethylene nonylphenyl ether, sodium lauryl sulfate or sodium dodecylbenzenesulfonate, a polymerization initiator such as a persulfate salt, azobisisobutyronitrile or a peroxide, and a molecular weight adjusting agent (chain transfer agent) such as butyl mercaptan, dodecyl mercaptan, isopropyl alcohol, methanol, octyl thioglycolate or carbon tetrachloride, and the resulting emulsion is continuously or intermittently fed to a reaction vessel and the polymerization reaction of the monomer mixture is completed.

Adjustment of the number average molecular weight, the ratio of Mw/Mn, average particle size of the copolymer particles in the copolymer emulsion and glass transition temperature of the copolymer is within the skill of the persons skilled in the art and can be easily carried out. For example, increase in the amount of the molecular weight adjusting agent (chain transfer agent) results in decrease in molecular weight. The ratio of Mw/Mn can be changed by varying the kind and/or amount of the molecular weight adjusting agent or by varying the amount of the emulsifier. Decrease in the amount of the emulsifier results in increase in the average particle size. If the amount of comonomer (a) is increased within the above range, the resulting copolymer will have a lower glass transition temperature Tg.

The copolymer emulsion per se may be made into an adhesive, or the copolymer emulsion may be formulated into an adhesive by using one or more additives if so desired. Examples of the additives are a filler, plasticizer, tackifier, thickening agent, wetting agent, anti-foaming agent, alkali agent, stabilizer, etc. In either case, in order to obtain good removability and to prevent lifting of labels, it is preferable that the proportion of the copolymer in the adhesive is at least 60% by weight, more preferably 80 to 99% by weight, based on the total weight of the solids of the copolymer emulsion (or based on the total weight of the solids of the copolymer emulsion which contains the above-mentioned additive or additives if such additive(s) is(are) used.).

For increasing the opacity of the removable adhesive sheet, a pigment is preferably added as a filler in an amount of 0.5 to 20% by weight, more preferably 1 to 10% by weight, based on the solids of the copolymer emulsion. This is particularly effective when paper weighing not more than 100 g/m² is used as the surface stock. As the pigment to be used as a filler, there may be mentioned kaolin, talc, clay, titanium oxide, calcium oxide, calcium hydroxide, calcium carbonate, magnesium hydroxide, magnesium carbonate, zinc oxide, zinc carbonate, aluminum oxide, aluminum hydroxide, among others. These may be used singly or at least two of them may be used in admixture.

The resulting copolymer emulsion (which optionally contains above-mentioned additive or additives) is formulated into an adhesive by adding thereto a polyglycidyl compound having two or more epoxy groups per molecule, and the resulting adhesive is applied to a release liner or a surface stock by a suitable application method using a conventional coater or the like. In that case, the adhesive is adjusted to a viscosity suited to the particular application method, for example, with use of a thickening agent. Therefore, the viscosity or solids concentration of the copolymer emulsion per se is not particularly limited and can be selected from a wide range. However, it is generally preferable that the concentration of solids (which include said additive(s) when such additive(s) is(are) used) of the copolymer emulsion be adjusted to 30 to 70% by weight. If the solids concentration is lower than 30% by weight, the efficiency of the drying process in the application of the adhesive is not satisfactory, whereas if the solids concentration is more than 70% by weight, the polymerization reaction becomes difficult to proceed.

The adhesive to be used in the present invention is prepared by adding to the above copolymer emulsion a polyglycidyl compound containing at least two, preferably 2 to 4, epoxy groups per molecule as a crosslinking agent in an amount such that the epoxy groups in the polyglycidyl compound amount to 0.5 to 2 equivalents, per equivalent of the carboxyl group in the copolymer mentioned above. If the polyglycidyl compound contains one epoxy group or less per molecule, the desired crossliking reaction would not take place, failing to improve cohesion of the adhesive, giving inferior removability and tending to allow bleeding, whereas if the polyglycidyl compound contains 5 or more epoxy groups within the molecule, the resulting adhesive tends to have reduced cohesion, thereby exhibiting inferior removability. If the amount of the glycidyl compound is less than 0.5 equivalent, the adhesion of the adhesive to articles will become too strong and adhesive transfer will occur, causing soiling of articles. If said amount exceeds 2 equivalents, the adhesive obtained will be poor in the anchoring effect on the surface stock.

As typical examples of the polyglycidyl compound to be used in accordance with the present invention, there may be mentioned ethylene glycol or poly(preferably having a polymerization degree of 2 to 30)ethylene glycol diglycidyl ethers, propylene glycol or poly(preferably having a polymerization degree of 2 to 30)propylene glycol diglycidyl ethers, neopentyl glycol diglycidyl ether, 1,6-hexanediol diglycidyl ether, dibromoneopentyl glycol diglycidyl ether, diglycidyl o-phthalate, glycerol poly(e.g., di- or tri)glycidyl ether, trimethylolpropane poly(e.g., di- or tri)glycidyl ether, diglycerol poly(e.g., di-, tri- or tetra)glycidyl ether, poly (e.g., tri- to octa)glycerol poly(e.g., di- to deca)glycidyl ethers, sorbitol poly(e.g., di- to hexa)glycidyl ether and the like. Further, N,N,N',N'-tetraglycidyl-m-xylenediamine, N,N,N',N",N"-pentaglycidyldiethylenetriamine, N,N,N',N'-tetraglycidylethylenediamine and the like may also be used. These polyglycidyl compounds may be used singly or at least two of them may be used in admixture.

The adhesive of the present invention is prepared by simply mixing the above copolymer emulsion and the above polyglycidyl compound to homogeneity by stirring.

The resulting adhesive is applied to the release agent layer of the release liner or to the rear side of the surface stock and dried to form an adhesive layer.

The viscosity of the adhesive is not particularly limited and is adjusted to a range suited to the coater to be used, by addition of a thickening agent.

Coating machines usable for coating the release liner or surface stock with the adhesive are, for example, reverse roll coaters, knife coaters, air knife coaters, bar coaters, slot die coaters, lip coaters, reverse gravure coaters and the like, and the coating amount is preferably within the range of about 5–50 g/m$^2$ on a dry weight basis.

Then the surface stock is superposed on the adhesive layer to provide the adhesive sheet of the invention. By aging the resulting adhesive sheet, the above polyglycidyl compound undergoes crosslinking reaction so that the adhesive sheet becomes in a stable state free of change in the properties of the adhesive layer. The condition under which the aging is carried out is not particularly limited, and may be 20° C. for about one week or 40° C. for about 3 days.

2 SURFACE STOCK

In the practice of the present invention, the surface stock is not particularly limited, but includes, for example, papers such as woodfree paper, crepe paper, water-proof paper and neutralized paper, films such as polyethylene films, polyester films, biaxially stretched polyester films, polypropylene films, polyvinyl chloride films, polycarbonate films, polystyrene films, synthetic paper and nonwoven fabrics, and various coated sheets prepared by providing various coating layers on the above paper or film (hereinafter referred to as "support"), such as art paper, coated paper or cast-coated paper, various heat-sensitive recording papers having various recording layers, paper for ink jet recording and paper for receiving thermally transferred images. Among these, surface stock is preferably one wherein paper is used as the support from the viewpoint of its cost and the anchoring effect of the adhesive on the surface stock.

Even when paper is used as the support, appearance impairment due to the excessive anchoring effect (bleeding) seldom occurs since the adhesive is adequately controlled in anchoring effect in the above manner. Therefore, the removable adhesive sheet according to the present invention is advantageous in that it can be produced very easily since limitations are seldom imposed on the temporary storage, just after adhesive sheet production, in the wound-up or piled-up state which is subject to high pressure.

In the case of heat-sensitive paper, an adhesive having an excessive anchoring effect tends to cause a reduction in color density of record images (desensitization), since the components of the adhesive permeate through the paper support and migrate to the heat-sensitive recording layer and interfere with the color forming reaction. With the adhesive to be used in accordance with the present invention, however, such an adverse effect will be hardly produced since, as mentioned above, the adhesive is adequately controlled in anchoring effect.

In cases where paper is used as the surface stock support and when the internal bond strength or ply strength, that is the interlaminar strength, is weak, paper break tends to occur on the occasion of peeling. Therefore, in the prior art, the paper to be used should have an internal bond strength of at least about 0.315 kJ/m$^2$ (150 ft·Lb/in$^2$) as determined by the JAPAN TAPPI testing methods of pulps and papers No. 54–'93.

On the contrary, with the adhesive to be used in accordance with the present invention, which in spite of its weak adhesion to articles, seldom allows lifting of labels, even paper containing a large proportion of regenerated pulp from waste paper and having relatively weak internal bond strength can also be used. More concretely, paper weak in internal bond strength as compared with the paper used in the prior art, for example paper whose internal bond strength is as low as about 0.147 kJ/m$^2$ (70 ft·Lb/in$^2$) can also be used. With the increase in internal bond strength, paper becomes more problem-free from the removability viewpoint but becomes too stiff, causing lifting of labels and/or deteriorating the printability. Thus, the internal bond strength is preferably less than 0.841 kJ/m$^2$ (400 ft·Lb/in2). The internal bond strength can be readily adjusted, for example by suitably selecting or combining the pulp fiber and internal additives to be used in paper stuff in papermaking.

The paper stuff may contain not only pulp fiber but also internal additives conventionally used in papermaking, such as a filler, a retention aid of anionic, nonionic, cationic or amphoteric nature, a drainage aid, a dry-strength resin, an internal size, etc. If necessary, a surface size can further be used conjointly.

The method of papermaking is not critical. Thus, for example, the acidic papermaking process in which paper is made at a pH of about 4.5, the so-called neutral papermaking process in which paper is made at a weakly acidic pH of about 6 to a weakly alkaline pH of about 9, and all other processes are acceptable. As regards the papermaking machine, a Fourdrinier paper machine, twin-wire former cylinder paper machine, Yankee paper machine and the like can appropriately be used.

In the practice of the present invention, a primer layer may be provided, as necessary, between the surface stock and the adhesive layer. Particularly when a support low in anchoring effect, such as a film, is used as the surface stock support, it is desirable that a primer layer be provided.

The primer layer may be prepared by using, for example, a pigment such as magnesium hydroxide, magnesium carbonate, magnesium sulfate, calcium oxide, calcium hydroxide, calcium carbonate, satin white, calcium silicate, zinc oxide, titanium oxide, aluminum oxide, aluminum hydroxide, talc or kaolin, and a binder such as starch, polyvinyl alcohol, carboxymethylcellulose, styrene-butadiene copolymer, an acrylic copolymer or a vinyl acetate copolymer.

The primer layer can be prepared by first dispersing the pigment and binder in water or in an organic solvent such as toluene or ethyl acetate to prepare a coating composition and then applying the coating composition in a conventional manner to the rear side of the surface stock support (i.e., a side which would contact with the binder layer if the primer layer were not provided), followed by drying.

The proportions of the pigment and the binder in the above coating composition can be selected from a wide range and variable depending on the type of binder or kind of the pigment. Generally, however, it is preferable that, based on the total weight of the binder and the pigment, the binder is used in an amount of 30 to 70% by weight and the pigment is used in an amount of 70 to 30% by weight.

The solids concentration of the coating composition can be adjusted to a range suited to the application method, with use of a thickening agent, and therefore is not particularly limited and can be suitably selected from a wide range. Generally, it is convenient that the solids concentration of the coating composition be about 30 to 70% by weight.

The amount of the coating composition for forming the primer layer to be applied may be variable depending on the kind of the binder or pigment, type of the surface stock and the like, but may generally be in the range of about 0.1 to 10 g/m$^2$ on dry weight basis.

According to the present invention, it is possible to use, as the surface stock, a paper sheet whose one side (front side) is coated with a coat layer such as a layer for ink jet printing, heat-sensitive recording layer or a layer for accepting thermally transferred images which may optionally contain a pigment. Such surface stock is used as superposed on the adhesive layer in a manner such that the other side (rear side) of the surface stock is contacted with the adhesive layer. In this case, the appearance impairment due to the bleeding of the adhesive is suppressed because the coating layer optionally containing a pigment is formed on the front side of the surface stock.

Such a coat layer is formed in a conventional manner, for example, by applying a coating composition for forming such a coat layer to the front side of the support composed of paper, followed by drying.

The pigment optionally used in the coat layer is not particularly limited, and includes, for example, kaolin, talc, clay, calcined clay, silica, titanium oxide, calcium oxide, calcium hydroxide, calcium carbonate, calcium sulfate, satin white, calcium silicate, magnesium hydroxide, magnesium carbonate, magnesium sulfate, magnesium silicate, zinc oxide, zinc carbonate, zinc sulfate, aluminum oxide, aluminum hydroxide, aluminum silicate, etc.

A binder is usually used in the coating composition for forming the coat layer. The binder is not particularly limited, either, and includes, for example, starch, polyvinyl alcohol, casein, carboxy-methylcellulose, dextrin, methylcellulose, styrene-butadiene copolymers, methyl methacrylate-butadiene copolymers, vinyl chloride copolymers, ethylene-vinyl chloride copolymers, vinylidene chloride copolymers, ethylene-vinylidene chloride copolymers, acrylic copolymers, vinyl acetate copolymers, ethylene-vinyl acetate copolymers, etc. Where necessary, a thickening agent, a dye or additives such as an antifoam, dispersing agent, wetting agent, etc, may be added to the coating composition for forming the coat layer.

The coating composition for forming the coat layer generally contains a pigment and a binder such as those mentioned above. The proportions of the pigment and the binder in the above coating composition can be selected from a wide range and are variable depending on the type of binder or kind of pigment. Generally, however, it is preferable that, based on the total weight of the binder and the pigment, the binder is used in an amount of 10 to 50% by weight and the pigment is used in an amount of 90 to 50% by weight.

The solids concentration of the coating composition can be adjusted to a range suited to the application method, with use of a thickening agent, and therefore is not particularly limited and can be suitably selected from a wide range. Generally, it is convenient that the solids concentration of the coating composition be about 30 to 70% by weight.

The amount of the coating composition for forming the coat layer to be applied may be variable depending on the kind of the binder or pigment, type of the surface stock and the like, but may generally be in the range of about 1 to 30 g/m$^2$ on a dry weight basis.

3 RELEASE LINER

Usable as the release liner are high-density base paper such as glassine paper, clay-coated paper, kraft paper, polymer-laminated paper such as polyethylene-laminated woodfree paper, films and the like, respectively provided with a release agent layer formed by application of a fluorine-containing resin or silicone resin which is conventionally used for preparing a release liner of adhesive sheets, in an amount of about 0.05-3 g/m$^2$ on a dry weight basis, followed by curing by heat-curing, by ionizing radiation curing or by other curing methods. Application machines usable for that purpose are, for example, multistage roll coaters, air knife coaters, bar coaters, offset gravure coaters, direct gravure coaters and the like.

4 REMOVABLE ADHESIVE SHEET

In the practice of the present invention, there is no particular restriction on the method of constructing the removable adhesive sheet. Following the conventional method, the adhesive is applied to the release agent layer of a release liner or to the rear side of the surface stock and dried, and a surface stock is superposed on the thus-formed adhesive layer for finishing.

The removable adhesive sheet according to the present invention thus prepared is used in a wide variety of ways, for example, as a label for process control, a price label, an index label for a video or audio cassette, a floppy disk or the like. For use, a label (adhesive layer+surface stock) is peeled off from the release liner and attached to an article.

When the information contained in tapes or disks is substituted with other information newly recorded, the old labels are peeled off and discarded and new labels are applied to the housing of the tapes or to the jacket of disks.

The removable adhesive sheets according to the present invention, when applied to articles, present no lifting or edge lifting and, when peeled off from the articles, show good removability without causing impairment of the article appearance or without causing article soiling due to surface stock breakage or adhesive transfer and, in addition, do not impair the surface stock as a result of bleeding.

EXAMPLES

The following examples illustrate the present invention in more detail. They are of course by no means limitative of the scope of the present invention.

In the examples, part(s), proportions and coating amounts are expressed on the solid weight basis (namely, calculated as the weight of the solids), unless otherwise specified, and percentages are all by weight unless otherwise specified.

The method of adhesive production and the method of removable adhesive sheet production, which were basically used in producing the removable adhesive sheets of Examples and Comparative Examples are described below.

ADHESIVE PRODUCTION

An autoclave equipped with a stirrer, a temperature controller and a reflux condenser was charged with water and a polymerization initiator, and the charge was heated to 70° C. Then, a monomer mixture, a molecular weight adjusting agent and an emulsifier were added, and the resultant mixture was stirred for emulsification to give a preemulsion.

The whole preemulsion was fed gradually and continuously over 3 hours with stirring at 80° C. for effecting emulsion polymerization. Then, stirring was further continued at 80° C. for 2 hours to complete the copolymerization.

To this copolymer emulsion was added a 50% dispersion of titanium oxide as a pigment in an amount of 6% by weight (calculated as titanium oxide) based on the solids of the copolymer emulsion, and the resulting mixture was adjusted to pH 8.5 with ammonia and then adjusted to a viscosity (measurement conditions: B type viscometer, No. 4 rotor, 60 r.p.m.) of 4,000 cps by adding a sodium salt of polyacrylic acid (Tradename "ASE-60", product of Rohm and Haas).

Then, diglycerol polyglycidyl ether (Trade name "Denacol EX-421", product of Nagase Chemicals Ltd. ;contains diglycerol triglycidyl ether in an amount of 90 wt. % or more) was added as a crosslinking agent in an amount such that the epoxy groups in the diglycerol polyglycidyl ether became equivalent to the carboxyl groups in the copolymer in said emulsion, whereby an adhesive was produced.

REMOVABLE ADHESIVE SHEET PRODUCTION

The above adhesive and a surface stock were used. The adhesive was applied to a commercially available polyethylene-laminated release liner in an amount of 25 g/m$^2$ on dry weight basis and dried, and the release liner having the resulting adhesive layer thereon and the surface stock were laminated together in such a manner that the adhesive layer was in contact with the rear side of said surface stock to give a removable adhesive sheet. The polyethylene-laminated release liner is one produced by fusion bonding a polyethylene film to woodfree paper to a thickness of about 15 μm, and forming a silicone resin layer on the polyethylene film.

EXAMPLE 1

An adhesive was produced by following the procedure mentioned above and using 94.3 parts of 2-ethylhexyl acrylate, 5.0 parts of acrylonitrile and 0.7 part of acrylic acid as the monomer mixture, 0.4 part of sodium persulfate as the polymerization initiator, 0.02 part of n-butyl mercaptan as the molecular weight adjusting agent, 1.0 part of sodium dodecylbenzenesulfonate and 1.0 part of polyoxyethylene nonylphenyl ether as the emulsifier, and 40 parts of water.

Using the obtained adhesive, a removable adhesive sheet was produced with use of a 50 μm-thick polyester film as the surface stock.

EXAMPLE 2

A removable adhesive sheet was produced in the same manner as in Example 1 except that woodfree paper weighing 75 g/m$^2$ was used as the surface stock.

EXAMPLE 3

A removable adhesive sheet was produced in the same manner as in Example 1 with the exception of using, as the surface stock, a coated paper having a paper thickness of 86 μm as obtained by applying, to the same woodfree paper weighing 75 g/m$^2$ as used in Example 2, a coating composition for forming a pigment coat layer comprising 40 parts of kaolin, 40 parts of calcium carbonate and 20 parts of a styrene-butadiene copolymer emulsion in an amount of 10 g/m$^2$ on a dry weight basis, followed by treatment on a 4-stage super calender.

The adhesive layer was formed on the opposite side of the pigment-coated side of the surface stock. The adhesive layer formed was in contact with the opposite side (uncoated side) of the surface stock.

EXAMPLE 4

A removable adhesive sheet was produced in the same manner as in Example 1 except that woodfree paper weighing 75 g/m$^2$ made of a papermaking furnish at an alkaline pH was used as the surface stock.

EXAMPLE 5

A removable adhesive sheet was produced in the same manner as in Example 3 except that titanium oxide was not used in the adhesive production mentioned above.

EXAMPLE 6

A removable adhesive sheet was produced in the same manner as in Example 3 except that the monomer mixture used was composed of 94.3 parts of 2-ethylhexyl acrylate, 3.0 parts of acrylonitrile, 0.7 part of acrylic acid and 2.0 parts of N-methylolacrylamide.

EXAMPLE 7

A removable adhesive sheet was produced in the same manner as in Example 3 except that the monomer mixture used was composed of 90.3 parts of isononyl acrylate, 5.0 parts of acrylonitrile, 0.7 part of methacrylic acid and 4.0 parts of butyl acrylate.

EXAMPLE 8

A removable adhesive sheet was produced in the same manner as in Example 3 except that the monomer mixture used was composed of 18.3 parts of isononyl acrylate, 74.0 parts of lauryl methacrylate, 5.0 parts of acrylonitrile, 0.7 part of acrylic acid and 2.0 parts of methyl methacrylate.

EXAMPLE 9

A removable adhesive sheet was produced in the same manner as in Example 3 except that the monomer mixture used was composed of 92.5 parts of 2-ethylhexyl acrylate, 3.3 parts of acrylonitrile, 0.7 part of methacrylic acid, 3.0 parts of N-methylolacrylamide and 0.5 part of dimethylaminoethyl methacrylate.

EXAMPLE 10

A removable adhesive sheet was produced in the same manner as in Example 2 except that the polyglycerol pentaglycidyl ether was used as a crosslinking agent in lieu of the diglycerol polyglycidyl ether.

COMPARATIVE EXAMPLE 1

A removable adhesive sheet was produced in the same manner as in Example 1 except that the amount of n-butylmercaptan as the molecular weight adjusting agent was reduced to 0.001 part.

COMPARATIVE EXAMPLE 2

A removable adhesive sheet was produced in the same manner as in Example 3 except that the amount of n-butylmercaptan as the molecular weight adjusting agent was reduced to 0.001 part.

COMPARATIVE EXAMPLE 3

A removable adhesive sheet was produced in the same manner as in Example 3 except that the amount of n-butylmercaptan as the molecular weight adjusting agent was increased to 0.5 part.

COMPARATIVE EXAMPLE 4

A removable adhesive sheet was produced in the same manner as in Example 3 except that the amount of sodium dodecylbenzenesulfonate as the emulsifier was reduced to 0.2 part.

COMPARATIVE EXAMPLE 5

A removable adhesive sheet was produced in the same manner as in Example 3 except that the amount of sodium dodecylbenzenesulfonate as the emulsifier was increased to 3.0 parts.

COMPARATIVE EXAMPLE 6

A removable adhesive sheet was produced in the same manner as in Example 3 except that 0.2 part of octyl thioglycolate was used as the molecular weight adjusting agent in lieu of n-butylmercaptan.

COMPARATIVE EXAMPLE 7

A removable adhesive sheet was produced in the same manner as in Example 3 except that 0.02 part of octyl thioglycolate was used as the molecular weight adjusting agent in lieu of n-butylmercaptan.

COMPARATIVE EXAMPLE 8

A removable adhesive sheet was produced in the same manner as in Example 3 except that the diglycerol polyglycidyl ether as the crosslinking agent was added in an amount such that the epoxy groups in the diglycerol polyglycidyl ether amounted to 6.0 equivalents relative to the carboxyl groups in the copolymer in the emulsion.

COMPARATIVE EXAMPLE 9

A removable adhesive sheet was produced in the same manner as in Example 3 except that the diglycerol polyglycidyl ether as the crosslinking agent was added in an amount such that the epoxy groups in the diglycerol polyglycidyl ether amounted to 0.1 equivalent relative to the carboxyl groups in the copolymer in the emulsion.

COMPARATIVE EXAMPLE 10

A removable adhesive sheet was produced in the same manner as in Example 3 except that allyl glycidyl ether was used as the crosslinking agent in lieu of the diglycerol polyglycidyl ether.

COMPARATIVE EXAMPLE 11

A removable adhesive sheet was produced in the same manner as in Example 3 except that the monomer mixture used was composed of 97.2 parts of 2-ethylhexyl acrylate, 0.1 part of acrylonitrile, 0.7 part of acrylic acid and 2.0 parts of N-methylolacrylamide.

COMPARATIVE EXAMPLE 12

A removable adhesive sheet was produced in the same manner as in Example 3 except that the monomer mixture used was composed of 82.3 parts of 2-ethylhexyl acrylate, 15.0 parts of acrylonitrile, 0.7 part of acrylic acid and 2.0 parts of N-methylolacrylamide.

COMPARATIVE EXAMPLE 13

A removable adhesive sheet was produced in the same manner as in Example 3 except that the monomer mixture used was composed of 30.0 parts of 2-ethylhexyl acrylate, 5.0 parts of acrylonitrile, 0.7 part of acrylic acid and 64.3 parts of butyl acrylate.

COMPARATIVE EXAMPLE 14

A removable adhesive sheet was produced in the same manner as in Example 3 except that the monomer mixture used was composed of 94.95 parts of 2-ethylhexyl acrylate, 3.0 parts of acrylonitrile, 0.05 part of acrylic acid and 2.0 parts of N-methylolacrylamide.

COMPARATIVE EXAMPLE 15

A removable adhesive sheet was produced in the same manner as in Example 3 except that the monomer mixture used was composed of 88.0 parts of 2-ethylhexyl acrylate, 3.0 parts of acrylonitrile, 7.0 parts of acrylic acid and 2.0 parts of N-methylolacrylamide.

COMPARATIVE EXAMPLE 16

A removable adhesive sheet was produced in the same manner as in Example 3 except that the monomer mixture used was composed of 64.0 parts of 2-ethylhexyl acrylate, 4.0 parts of acrylonitrile, 0.7 part of acrylic acid, 29.3 parts of butyl acrylate and 2.0 parts of N-methylolacrylamide.

For each of the adhesives used in Examples 1–10 and Comparative Examples 1–16, the polystyrene-equivalent number average molecular weight, the ratio of polystyrene-equivalent weight average molecular weight (Mw) to polystyrene-equivalent number average molecular weight (Mn), the average particle size and the glass transition temperature of the copolymer obtained upon completion of the copolymerization of the preemulsion were determined by the methods described below. The results are shown in Table 1.

POLYSTYRENE-EQUIVALENT NUMBER AVERAGE MOLECULAR WEIGHT AND RATIO OF POLYSTYRENE-EQUIVALENT WEIGHT AVERAGE MOLECULAR WEIGHT TO POLYSTYRENE-EQUIVALENT NUMBER AVERAGE MOLECULAR WEIGHT

Measurements were carried out using a gel permeation chromatography apparatus (Tradename "HCL-8020", product of Tosoh Corp.).

AVERAGE PARTICLE SIZE

Measurements were made using a particle size analyzer (Tradename "Nanosizer") product of Coulter Electronics Inc.).

GLASS TRANSITION TEMPERATURE

Calculated according to the equation (1) shown hereinabove using the glass transition temperature value of the homopolymer of each monomer.

TABLE 1

| | Mn (×10⁴) | Mw/Mn | Average particle size (nm) | Glass transition temperature (°C.) |
|---|---|---|---|---|
| Example 1 | 2.7 | 200 | 290 | −62 |
| Example 2 | 2.7 | 200 | 290 | −62 |
| Example 3 | 2.7 | 200 | 290 | −62 |
| Example 4 | 2.7 | 200 | 290 | −62 |
| Example 5 | 2.7 | 200 | 290 | −62 |
| Example 6 | 1.7 | 170 | 300 | −62 |
| Example 7 | 2.9 | 190 | 300 | −70 |
| Example 8 | 2.6 | 100 | 290 | −60 |
| Example 9 | 2.1 | 500 | 280 | −61 |
| Example 10 | 2.7 | 200 | 290 | −62 |
| Comparative Example 1 | 9.0 | 250 | 290 | −62 |
| Comparative Example 2 | 9.0 | 250 | 290 | −62 |
| Comparative Example 3 | 0.05 | 210 | 210 | −62 |
| Comparative Example 4 | 2.4 | 290 | 680 | −62 |
| Comparative Example 5 | 2.4 | 300 | 60 | −62 |
| Comparative Example 6 | 2.3 | 25 | 300 | −62 |
| Comparative Example 7 | 2.7 | 900 | 290 | −62 |
| Comparative Example 8 | 2.7 | 200 | 290 | −62 |
| Comparative Example 9 | 2.7 | 200 | 290 | −62 |
| Comparative Example 10 | 2.7 | 200 | 290 | −62 |
| Comparative Example 11 | 2.8 | 320 | 300 | −65 |
| Comparative Example 12 | 2.0 | 190 | 270 | −54 |
| Comparative Example 13 | 2.6 | 200 | 290 | −56 |
| Comparative Example 14 | 2.1 | 500 | 310 | −60 |
| Comparative Example 15 | 1.5 | 350 | 290 | −56 |
| Comparative Example 16 | 2.2 | 220 | 310 | −58 |

Mw: polystyrene-equivalent weight average molecular weight
Mn: polystyrene-equivalent number average molecular weight The removable adhesive sheets obtained in Examples 1–10 and Comparative Examples 1–16 were evaluated for label lifting, removability and bleeding tendency by the methods mentioned below. The label lifting and removability evaluations were carried out after subjecting the removable adhesive sheets to 2 weeks of aging in an atmosphere maintained at 23° C. and 65% RH. The results obtained are shown in Table 2.

LABEL LIFTING

A test piece (i.e., a label peeled off from the removable adhesive sheet) was affixed to a jacket (made of ABS resin) of a 3.5-inch floppy disk such that the test piece had a 180° fold-back portion, and then allowed to stand, in that state, in an atmosphere maintained at 70° C. for 7 days and further to stand in an atmosphere maintained at 23° C. and 65% RH for 24 hours. Then, the state of the test piece was examined. The following criteria were used in evaluating for label lifting.

A: No lifting at all.

B: Slight degree of lifting.

C: Considerable degree of lifting.

D: Test piece completely detached from the rear side of the jacket of the floppy disk.

REMOVABILITY

A test piece (i.e., a label peeled off from the removable adhesive sheet) was affixed to an ABS plate having a smooth surface or to a jacket (made of ABS resin) of a 3.5-inch floppy disk.

After allowing to stand, in that state, in an atmosphere maintained at 23° C. and 65% RH for 7 days, the test piece was peeled off at a speed of 300 mm/minute and at an angle of 180°. Then, the state of the article was examined. The removability was evaluated according to the following criteria.

A: Neither adhesive residue nor surface stock residue remaining on the article.

B: A small amount of adhesive remaining.

C: A fairly large amount of adhesive remaining.

D: A fragment(s) of broken surface stock remaining.

BLEEDING

Evaluation of bleeding was carried out immediately after the production of each of the removal adhesive sheets.

A pressure of 1 kg/m² was applied to each test piece (i.e., a piece of removal adhesive sheet), and the test piece was allowed to stand, in that state, in an atmosphere maintained at 25° C. for 24 hours, and then examined for bleeding. In the bleeding evaluation, the following criteria were used.

A: No bleeding at all.
B: A slight degree of bleeding.
C: A considerable degree of bleeding.

TABLE 2

| | Label lifting | Removability ABS plate | *FD | Bleeding |
|---|---|---|---|---|
| Example 1 | A | B | A | A |
| Example 2 | A | A | A | A |
| Example 3 | A | A | A | A |
| Example 4 | A | A | A | A |
| Example 5 | A | A | A | A |
| Example 6 | A | A | A | A |
| Example 7 | A | A | A | A |
| Example 8 | A | A | A | A |
| Example 9 | A | A | A | A |
| Example 10 | A | B | B | A |
| Comparative Example 1 | C | C | B | A |
| Comparative Example 2 | D | B | A | A |
| Comparative Example 3 | A | B | A | C |
| Comparative Example 4 | B | C | B | A |
| Comparative Example 5 | C | A | A | C |
| Comparative Example 6 | C | A | A | A |
| Comparative Example 7 | A | A | A | C |
| Comparative Example 8 | C | A | A | A |
| Comparative Example 9 | A | C | B | B |
| Comparative Example 10 | A | C | C | C |
| Comparative Example 11 | A | A | A | B |
| Comparative Example 12 | C | D | D | A |
| Comparative Example 13 | B | D | A | B |
| Comparative Example 14 | A | C | C | C |
| Comparative Example 15 | D | D | A | A |
| Comparative Example 16 | B | D | A | B |

*FD: 3.5 inch floppy disk

OTHER EVALUATION ITEMS

Although the paper sheets used as the surface stock in Examples 2 through 9 were relatively weak in interlaminar strength with an internal bond strength of about 100 ft·Lb/in², the removability was good in every case.

In Example 5, where the incorporation of the pigment into the adhesive was omitted, the opacity seemed a little inferior as compared with Example 3. However, the adhesive sheet of Example 5 was usable without posing any practical problem.

In addition to the examples mentioned above, removable adhesive sheets were produced in the same manner as in Example 3 except that paper for receiving thermally transferred images, paper for ink jet printing and heat-sensitive recording paper were respectively used as the surface stock. The obtained removable adhesive sheets were then tested in the same manner as in Example 3. The evaluation results were substantially the same as those obtained in Example 3.

In Example 1, removability from the ABS plate was rated B, since a small amount of adhesive was remaining depending on the samples. This is because the polyester film was used as the surface stock. When a primer layer was formed on the rear side of the polyester film, removability of the resulting label was substantially the same as that (rated A) of the label wherein a paper sheet was used as the surface stock.

What is claimed is:

1. A removable adhesive sheet comprising a laminate of a release liner, an adhesive layer and a surface stock, wherein the adhesive layer is formed between the release liner and surface stock by applying an adhesive to the release liner or to the surface stock, followed by drying, said adhesive comprising (i) an aqueous emulsion of a copolymer obtained by emulsion polymerization and (ii) a polyglycidyl compound having two or more epoxy groups within the molecule thereof, said copolymer comprising, on the whole copolymer weight basis, (a) 80–99% by weight of a (meth)acrylic acid $C_8$–$C_{12}$ alkyl ester, (b) 0.3–10% by weight of (meth)acrylonitrile, (c) 0.1–5% by weight of an $\alpha,\beta$-unsaturated carboxylic acid and (d) 0–5% by weight of another monomer copolymerizable with the above-mentioned monomers (a), (b) and (c), said copolymer having a polystyrene-equivalent number average molecular weight of not less than $0.1\times10^4$ but less than $5.0\times10^4$, a polystyrene-equivalent weight average molecular weight (Mw)/ polystyrene-equivalent number average molecular weight (Mn) ratio (Mw/Mn) of 40–800, an average particle size of 100–500 nm and a glass transition temperature of not higher than −50° C., and said polyglycidyl compound being used in an amount such that the epoxy groups amount to 0.5 to 2 equivalents relative to the carboxyl groups in said copolymer.

2. A removable adhesive sheet as claimed in claim 1, wherein said copolymer comprises, on the whole copolymer weight basis, (a) 85–99% by weight of a (meth)acrylic acid $C_8$–$C_{12}$ alkyl ester, (b) 0.5–7% by weight of (meth)acrylonitrile, (c) 0.2–4% by weight of an $\alpha,\beta$-unsaturated carboxylic acid and (d) 0–5% by weight of another monomer copolymerizable with the above-mentioned monomers (a), (b) and (c).

3. A removable adhesive sheet as claimed in claim 1, wherein said (meth)acrylic acid $C_8$–$C_{12}$ alkyl ester, namely comonomer (a), is at least one member selected from the group consisting of 2-ethylhexyl acrylate, isononyl acrylate and lauryl methacrylate.

4. A removable adhesive sheet as claimed in claim 1, wherein said comonomer (b) is acrylonitrile.

5. A removable adhesive sheet as claimed claim 1, wherein said $\alpha,\beta$-unsaturated carboxylic acid, namely comonomer (c), is at least one member selected from the group consisting of acrylic acid, methacrylic acid, itaconic acid, maleic acid and fumaric acid.

6. A removable adhesive sheet as claimed in claim 1, wherein said copolymerizable monomer, namely monomer (d), is at least one vinyl monomer.

7. A removable adhesive sheet as claimed in claim 1, wherein said copolymerizable monomer, namely monomer (d), is at least one member selected from the group consisting of (meth)acrylic acid $C_1$–$C_7$ alkyl esters, (meth)acrylic acid hydroxyalkyl esters, (meth)acrylic acid alkoxyalkyl esters, (meth)acrylic acid glycidyl esters, acrylamide, methacrylamide, N-methylolacrylamide, N-methoxymethylacrylamide, N-methoxybutylacrylamide, styrene and α-methylstyrene.

8. A removable adhesive sheet as claimed in claim 1, wherein said copolymer has a polystyrene-equivalent number average molecular weight of not less than $0.3 \times 10^4$ but less than $4.5 \times 10^4$, a polystyrene-equivalent weight average molecular weight (Mw)/polystyrene-equivalent number average molecular weight (Mn) ratio (Mw/Mn) of 50–700, an average particle size of 150–450 nm and a glass transition temperature of −90° C. to −50° C.

9. A removable adhesive sheet as claimed in claim 1, wherein said polyglycidyl compound is at least one member selected from the group consisting of ethylene glycol or polyethylene glycol diglycidyl ethers, propylene glycol or polypropylene glycol diglycidyl ethers, neopentyl glycol diglycidyl ether, 1,6-hexanediol diglycidyl ether, dibromo-neopentyl glycol diglycidyl ether, diglycidyl o-phthalate, glycerol polyglycidyl ether, trimethylolpropane polyglycidyl ether, diglycerol polyglycidyl ether, polyglycerol polyglycidyl ethers, sorbitol polyglycidyl ether, N,N,N',N'-tetraglycidyl-m-xylenediamine, N,N,N',N",N"-pentaglycidyldiethylenetriamine and N,N,N',N'-tetraglycidylethylenediamine.

10. A removable adhesive sheet as claimed in claim 1, wherein said adhesive layer further contains a pigment.

11. A removable adhesive sheet as claimed in claim 10, wherein said pigment is at least one member selected from the group consisting of kaolin, talc, clay, titanium oxide, calcium oxide, calcium hydroxide, calcium carbonate, magnesium hydroxide, magnesium carbonate, zinc oxide, zinc carbonate, aluminum oxide and aluminum hydroxide.

12. A removable adhesive sheet as claimed in claim 10, wherein said pigment is used in an amount of 0.5 to 20% by weight, based on the solids of the aqueous emulsion of the copolymer.

13. A removable adhesive sheet as claimed in claim 1, which further comprises a primer layer between the surface stock and the adhesive layer, the primer layer comprising a pigment and a binder.

14. A removable adhesive sheet as claimed in claim 1, which further comprises a coat layer on the side of the surface stock opposite the side having the adhesive layer thereon, the coat layer comprising either a binder or a pigment and a binder.

15. A removable adhesive sheet as claimed in claim 1, wherein the polyglycidyl compound has 2 to 4 epoxy groups within the molecule thereof.

* * * * *